INVENTORS:
WILLIAM F. MARANTETTE
RUTH B. MARANTETTE
BY Elliott & Pastoriza,
ATTORNEYS.

3,532,893
WORK POSITION SCANNING SYSTEM USING
CONTROL AND MASTER TEMPLATES
William F. Marantette and Ruth B. Marantette, both of
20624 Earl St., Torrance, Calif. 90503
Filed Nov. 20, 1968, Ser. No. 777,331
Int. Cl. G06k 7/10
U.S. Cl. 250—219                                    7 Claims

ABSTRACT OF THE DISCLOSURE

A work position scanning system is provided to facilitate automatic drilling of holes in printed circuit boards. The system includes a master template having holes in successive positions including all possible positions in a circuit board at which holes might be provided. For the drilling of any one particular circuit board, a control template is provided with positions indicated thereon corresponding only to the positions to be defined in a particular circuit board. Servo means together with sequencing and control means fuction to move the work, the master template, and the control template simultaneously as a unit structure and successively stop the work at the specific positions defined by the control template in accord with generated control signals. A control signal generating means in turn includes a first stationary sensing means responsive to the passing of the positions indicated on the control template when moving to provide the control signals to the sequencing and control means. A second sensing means in turn is responsive to the positioning of a hole in the master template upon stopping of the servo means for providing further control signals to the sequencing and control means to thereby effect an exact positioning of the work in accordance with the position of the hole in the master template. The control template effectively constitutes a program for automatically sequentially operating a drill for successively drilling holes at specific locations in the circuit board. The master template provides a means of assuring an exact positioning of the drill immediately prior to a particular drilling operation.

---

This invention relates to a system for automatically positioning a work in a machining operation at a succession of coordinate points in an X and Y coordinate plane in accordance with any one of a number of possible programs. More particularly, the invention has to do with a scanning system wherein a work such as a printed circuit board may be successively positioned in accordance with given positions or indications on a control template wherein various positions marked on the control template are successively scanned.

BACKGROUND OF THE INVENTION

In our U.S. Pat. No. 3,293,442 issued Dec. 20, 1966, there is described a work position programming and recording system useful in the automatic drilling of circuit boards. In that system, a power drill is caused to automatically successively drill a circuit board at various given positions or locations on the board in accord with a prerecorded program. This program is recorded on a transparent material scanned by photocells, the recording medium for the program in turn being produced from suitable input information defining the desired program. With this arrangement, a great number of circuit boards may be drilled in accord with the given program, the programming of the medium enabling successive boards to be drilled in accord with the program completely automatically.

In our U.S. Pat. No. 3,293,439, also issued on Dec. 20, 1966, there is described a two-axis photo-electric positioning system which can readily be used in conjunction with the above described system in our U.S. Pat. 3,293,442. Essentially, our Pat. 3,293,439 provides a photoresponsive system enabling exact positioning of a hole in a board such as a master template corresponding to the exact drilling position in a particular board to be drilled. Thus, in causing a work to move under a drill means to a series of successive positions, once the approximate position has been located, it is desirable to assure that an exact positioning prior to drilling takes place.

While the systems described in our referred to United States patents greatly facilitate accurate drilling of a large number of circuit boards completely automatically, there is still involved the intermediary of a recording medium upon which a given program must be recorded before a given run of circuit boards can be drilled in accord with the program.

BRIEF DESCRIPTION OF THE PRESENT INVENTION

The present invention contemplates a system for facilitating automatic drilling of circuit boards in accord with a given program but wherein the provision of a special recording medium is avoided. However, the system of the present invention does take advantage of the photocell exact positioning arrangement described in our earlier U.S. Pat. 3,293,439.

More particularly, rather than provide an intermediate recording medium such as a transparent film as described in our U.S. Pat. 3,293,442, a photocopy of a control board or control template having thereon indications of the precise drill locations to be effected is utilized directly and scanned in such a manner as to cause the circuit board itself or work to the automatically positioned at the locations indicated on the photocopy or control template. A master template having holes corresponding to all possible positions in any one program as defined by a control template is utilized in conjunction with the photoelectric exact positioning system to assure that the circuit boards being drilled are accurately drilled at precise locations.

The present invention thus provides a work position scanning system for automatically successively positioning a work in a plurality of given positions in accordance with one program of a number of possible programs. This system includes a master template having holes in successive positions including all positions defined by all of said number of possible programs. A control template in turn has positions indicated thereon corresponding to positions defined by the desired one program. Suitable servo means are provided for moving the work, master template, and control template simultaneously as a unit structure. A sequencing and control means is connected to successively stop the servo means approximately at the plurality of given positions in response to control signals. The control signals in turn are provided by a first sensing means responsive to the passing of the positions indicated on the control template when moving to provide the control signals to the sequencing and control means and a second sensing means responsive to the positioning of a hole in the master template in a given relationsihp thereto upon stopping of the servo means for providing further control signals to the sequencing and control means. These further control signals effect an exact positioning of the work in accordance with the position of the hole in the master template. This second sensing means is identical to the photo-electric sensing system described in our U.S. Pat. 3,293,439. However, the combination of this second sensing means with the first sensing means enabling a scanning operation to take place together with certain other additions and controls constitute a new combination making up the present invention.

BRIEF DESCRIPTION OF THE DRAWING

A better understanding of the present invention will be had by referring to the accompanying drawing in which:

The single figure illustrates partly in block form, partly schematically, and partly in perspective exploded view various components making up the work position scanning system of the present invention.

DETAILED DESCRIPTION OF THE PREFERRED EMBODIMENT

Figure 1:
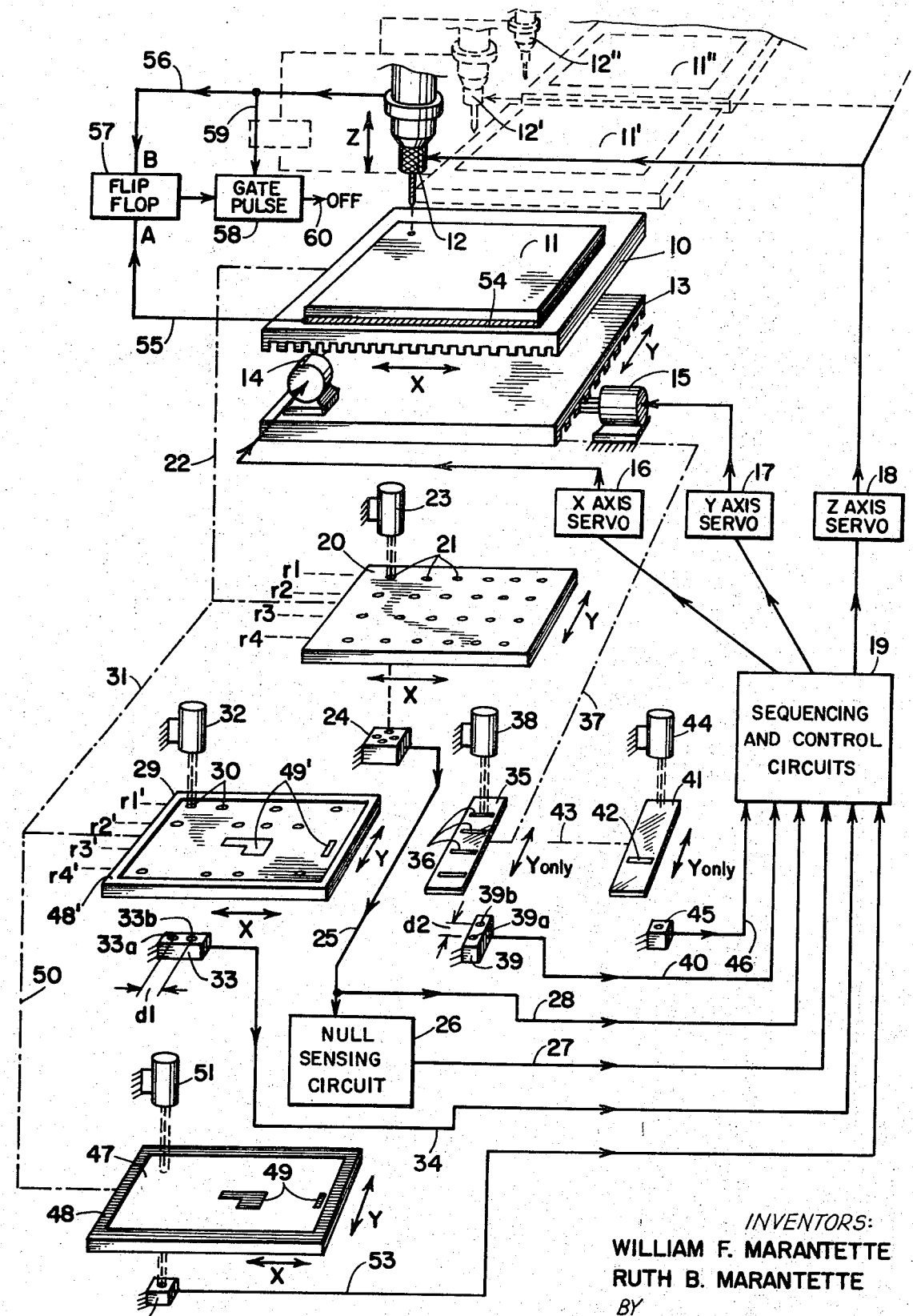

Referring to the drawing there is shown in the upper central portion a work table 10 for holding a work 11 which may constitute a printed circuit board to be drilled at certain given positions. The table 10 and work 11 are movable together relative to a drill 12 which is stationarily mounted in a position above the work. Towards this end, there is provided a second table 13 mounting a first servo motor 14 in engagement with the work table 10 for moving the same in an X axis direction as indicated by the double headed arrow. The second table 13 in turn is coupled with a second servo motor 15 for moving the second table in a Y axis direction or at right angles to the direction of the X axis. By this arrangement, it will be evident that the work or board 11 on the table 10 may be moved to any coordinate position on an X and Y coordinate plot by suitable operation of the first and second servo motors 14 and 15 either separately or simultaneously. In addition, the drill 12, while stationary with respect to movement in an X or Y direction is capable of moving in a vertical or Z axis direction.

The first and second servo motors 14 and 15 and drill 12 are connected respectively to X axis servo control means 16, Y axis servo control means 17, and Z axis servo control means 18 constituting generally a servo means for passing control signals from suitable sequencing and control circuits all indicated by the block 19 to the various servo motors and drill.

Below the work table structure described, there is shown in the drawing a master template 20 having holes 21 therein in successive positions which include all positions in which any holes might possibly be drilled in any circuit board in accord with any given program. Generally, the holes 21 are formed in parallel rows extending in the direction of the X axis as indicated at r1, r2, r3, and r4. Normally there would be provided many more rows of holes and many more holes in each row, only a few being shown for purposes of simplifying description of the invention.

As schematically indicated by the dash-dot line 22, the master template 20 is interconnected with the table 10 for simultaneous movements therewith in X or Y directions. A control signal generating means is provided in the form of a light source 23 and cooperating photocell detecting unit 24 positioned on opposite sides of the master template 20 such that signals are generated in the photocell structure 24 whenever one of the holes 21 permits light from the source 20 to pass therethrough to the cell. These signals are passed through a line 25 to a suitable null sensing circuit 26. Output signals to the sequencing and control circuits 19 are passed from the null sensing circuit and the line 25 by leads 27 and 28. The signals provided by the cooperation of the master template 20 with the light source 23 and photo unit 24 are utilized to effect an exact positioning of the work 11 relative to the drill 12 in accord with the exact positioning of a corresponding hole 21 in the master template relative to the light source and photo unit. In this respect, the photo unit 24 may be identical to the photo-electric positioning system described in our heretofore referred to Pat. 3,293,439.

Referring now to the central portion of the single drawing, there is schematically illustrated a control template 29 having a plurality of given positions indicated thereon by means of holes 30 in accord with one program of a number of possible programs. The control template 29, as in the case of the master template 20, is interconnected with the work table 10 for simultaneous movement therewith in X and Y directions as indicated by the dash-dot lines 31 and 22. Control signal generating means cooperating with the control template 29 take the form of a light source 32 and dual photocell unit 33 positioned on opposite sides of the template as shown. The dual photo means 33 includes first and second photocells 33a and 33b spaced apart by a small distance $d1$ in the direction of the X axis as shown. First and second signals from these cells respectively are passed through a line 34 to the seqeuncing and control circuits.

Shown to the right of the control template 29 is a row indexing template 35 in the form of an elongated medium having row positions indicated thereon as at 36. These indications may take the form of elongated transparent slots, the medium 35 being generally opaque. The row indexing template is interconnected with the second table 13 for movement in a Y direction only simultaneously with movement of the table 13 in a Y direction when the second servo motor 15 is energized.

Cooperating with the row indexing template is a light source 38 and dual photo unit 39 positioned on opposite sides of the template as shown. The dual photo unit 39 includes first and second photocells 39a and 39b in alignment with the Y axis direction, these cells being separated by a small distance $d2$. Control signals from these cells are passed through a line 40 to the seqeuncing and control circuits.

The various components described thus far are sufficient for a proper working of the invention as will become evident when the overall operation is set forth. However, to provide additional advantages, further components and innovations are included for cooperation with the system as set forth.

The first of these further innovations contemplates the provision of an additional row indexing template indicated at 41 to the right of the row indexing template 35. This additional template 41 includes row position indicators in the form of transparent slots such as indicated at 42. However, there are only provided such markings or slots at row positions corresponding to rows in the control template 29 which lack any indications. In the particular example set forth, it will be noted that the row $r3'$ for the control template 29 does not have any openings or markings 30 thereon and thus this particular row is in alignment with the slot 42. As in the case of the row indexing template 35, the additional row indexing template 41 is interconected with the second table 13 for simultaneous movement in a Y direction only. A light source 44 and photocell unit 45 are positioned on opposite sides of the additional template 41 as shown. The photocell unit 45 provides a signal to the sequencing and control circuits through a line 46. The purpose for this additional row indexing template will be described when the operation of the overall scanning system is set forth.

Referring now to the lower left portion of the drawing, there is shown a masking template 47 having masked portions such as marginal areas 48 and possible central areas 49 formed thereon. The masking template 47 is interconnected with the work table 10 for simultaneous movement therewith in X and Y directions as indicated by the dash-dot line 50 connecting to line 31 and line 22.

The light source 51 and photocell unit 52 are disposed on opposite sides of the masking template 47 as shown. Signals from the photocell unit 52 pass through a line 53 to the sequencing and control circuits 19.

Finally, as an adjunct to the present system, there is provided a drill control system for automatically shutting off the drilling operation should a drill break or a bore not be completed through the circuit board 11. This system is schematically illustrated at the upper portion of the drawing wherein it will be noted that the underside of the printed circuit board 11 includes a conducting surface 54. A lead 55 extends from this surface and this lead together with a further lead 56 connecting to the drill 12 connects to a flip-flop circuit 57. In addition, there is provided a gate pulse generator 58 connected through lead 59 to the drill 12 and responsive to movement of the drill. An output from this gate pulse circuit is indicated at 60 and connects to suitable control circuits for turning off the drill in the event a signal is provided on the lead 60. The arrangement is such that if a bore hole is completed through the circuit board 11, an electrical connection will be effected between the end of the drill and the conducting medium 54 on the bottom of the board to thereby control the circuits 57 and 58 in such a manner that the drilling operation can be maintained. On the other hand, should the drill not contact the conducting medium 54 because of failure to drill completely through the circuit board or possibly because of a broken drill, the circuits 57 and 58 cooperate together to automatically turn off the drill.

OPERATION

The complete operation of the various components of the work positioning scanning system of this invention as described will now be set forth.

Still with reference to the drawing, in an actual system there would ordinarily be provided a plurality of drill heads such as indicated by the phantom lines at 12', 12", and so forth. The additional drill heads move simultaneously with the drill 12 in the direction of the Z axis and serve to drill holes in additional circuit boards indicated in phantom lines at 11', 11", and so forth all carried on the same table 10.

In addition, a plurality of circuit boards may be stacked in the same positions as the top circuit boards 11, 11', 11" and so forth so that simultaneous drilling through stacks of boards can be effected in the event a large number of circuit boards are to be drilled in an identical manner.

Assume for illustrative purposes that the circuit boards are to be drilled in accord with a given program defined by the control template 29. This control template 29 may be formed from the specifications designating the particular locations of holes to be drilled in the boards as by providing a photocopy wherein the various indications 30 might constitute transparent openings in an otherwise opaque sheet. Thus in the particular control template shown in the drawing, there are provided some position locations in the form of holes 30 in the row r1' corresponding to first and second successive holes a fourth hole and a sixth hole. In the second row r2' the programmed holes appear as a first hole and a third, fourth, and fifth hole only. In the third row r3', there are no holes thus indicating that for this particular set of circuit boards there are not required any holes in the third row. In the fourth row r4', there is provided a first hole, third and fourth successive holes and a sixth hole.

The master template 20, as mentioned, includes holes 21 which occur in all of the rows in all of the positions to thus include any particular program as defined by a control template. The master template 20 is thus a precise component of the mechanism and remains a constant part of the scanning system, while the control template may be changed in accord with the particular program involved.

Initially, the circuit boards such as 11 are positioned on the table 10 such that the drill 12 is disposed above the board when the light source 23 for the master template 20 is disposed above the first hole in the first row. The control template 29 is then positioned and assuming that it includes a corresponding marking or hole 30 at the initial position of the first row, it can be properly located relative to the master template 20 by positioning it such that the hole 30 permits light from the source 32 to strike the dual cell structure 33. Signals from the cell 33 will then pass to the sequencing and control circuits and stop the servos 14 and 15 to hold the table 10 and circuit board 11 in the set position. Signals from the photocell 24 as a consequence of the light source 23 passing through the first opening 21 in the master template in turn will then effect an exact positioning of the table 10 relative to the opening 21 in the master template. This exact positioning control by the photocell unit 24 is effected by the circuit described in our heretofore referred to U.S. Pat. 3,283,439, the subject matter of which is incorporated herein by reference.

The drilling heads are then started and a first hole will be drilled in the respective circuit boards. When the head returns to its up position after drilling, the X servo motor 14 is automatically actuated to move the table 10, master template 20, and control template 29 as a unit such that the light source 32 and dual photo unit 33 for the control template 29 will effectively scan the various indications or openings 30 in the first row r1' of the control template. Considering the relative movements involved, the control template 29 can be visualized in the drawing as moving to the left in response to operation of the X axis servo motor. Under these conditions, the photocell 33a of the dual photocell unit 33 will first be energized by light from the source 32 passing through the next successive opening 30. A first control signal will be generated and passed to the sequencing and control circuits which functions to pass the signal through the X axis servo 16 to the X axis servo motor 14 to decelerate movement of the table 10 by the servo motor. When the light from the source 32 strikes the second photocell 33b of the dual photocell unit, a second signal is passed through the circuits to the X servo motor to stop the same at approximately a location where the light source is irradiating only the second photocell 33b.

At the time this above-described approximate positioning occurs, the corresponding opening 21 of the master template 20 will be approximately positioned between the light source 23 and photocell 24. The photocell unit 24 will then generate further signals in accord with the teachings of our U.S. Pat. 3,293,439 and pass the same through the sequencing and control circuits to the X axis and Y axis servo motors to effect an exact positioning of the work in accordance with the hole in the master template.

After exact positioning has been achieved, a signal is passed to the Z axis servo to operate the drill heads and effect a drilling at the corresponding position on the printed circuit boards. When this drilling is completed, the X servo motor is again energized to continue the scanning operation and the successive drilling of holes at the locations determined by the locations of the holes on the control template will continue throughout the length of the row r1'.

At the end of any one row, suitable microswitch means are energized to stop operation of the X servo motor and energize the Y servo motor. The Y servo motor will then move the work table, master template, and control template in a Y direction such as to align the next row with one of the row indexing indications 36 on the row indexing template 35. Thus, with the Y axis servo energized, when light from the source 38 passes through one of the transparent slots 36, a signal is provided by the dual photocell 39 to the sequencing and control circuits to stop operation of the Y servo motor. Thereafter, the X axis servo is operated at rapid speed to return the table, master template, and control template to an initial position by moving the same simultaneously to the right as viewed in the drawing so that the system is now aligned for the row r2. Scanning in the X axis direction is then again started by suitable microswitch means responsive to return of the structure for the second row r2'. Gradual deceleration and stopping by the dual photocell unit 33 is again accomplished when the next opening falls between the source 32 and photo unit 33. In the example shown, there is not any marking corresponding to the second position in the second row of the control template and therefore the scanning will pass directly from the first hole in the second row to the third hole. Any signals generated in the master template photo unit 24 as a consequence of the second hole in the second row passing between the light source 23 and photo unit 24 will have no effect, operating of the sensing means for the master template 20 only being triggered when the control template is approximately positioned at a programmed location.

The foregoing described scanning will continue until all of the rows of the control template have been scanned from left to right. It should be noted that rather than simply return the entire structure to position the control template with its left end adjacent to the sensing photo unit 33, drilling could be accomplished during the return but this would require a second dual photocell unit for decelerating and stopping the system and it is found more economical to simply return the structure to the beginning and scan each row in a consistent X axis direction.

From the description of the operation thus far, it will be evident that a plurality of circuit boards may readily be drilled simultaneously in accord with the program on the particular control template employed. In essence, the control template and associated sensing means in the form of the light sources 32 and 33, hereinafter referred to as a first sensing means serves to approximately locate the table and work at a programmed position. Thereafter, the master template 20 and light source 23 and photocell unit 24, hereinafter referred to as a second sensing means functions to effect an exact positioning of the table in accordance with the precise geometrical location of the hole in the master template. By this arrangement, consistent and accurate drilling of the holes in the printed circuit board in accord with a master template consistent for all particular boards to be drilled is realized and any slight variations in hole positions in the control templates provided by a photocopy from a given program will not affect the final accuracy.

In many instances, a particular control template may be programmed with relatively few indications or openings and in some instances entire rows may be lacking any position indications. In this event, it would be inefficient to have the mechanism scan each successive row. To avoid this problem, the additional row indexing template 41 is provided. As described heretofore, this template includes only markings or slots such as indicated at 42 juxtaposed rows in the control template for which there are no indications. Thus in the particular example set forth, wherein row 3' does not include any holes, there is provided the slot or marking 42 on the additional row indexing template 41. The associated photocell 45 serves to provide a control signal which nullifies the effect of the corresponding control signal from the corresponding slot or indicator mark 36 on the row indexing template 35 such that the Y axis servo motor will simply skip over this particular row designation and pass to the next one. It is thus possible to scan in a Y direction only to those rows which include indications to guide drilling.

By utilizing two photocells in the row indexing template photocell unit 39 as shown in the drawing, a first deceleration of movement of the structure in the direction of the Y axis can be effected in response to a signal from the first cell illuminated and thence a complete stopping effected when the second cell is illuminated in the same manner as the X axis servo is controlled by the two photocells 33a and 33b. Alternatively, the two cells in 39a and 39b may be so interconnected that a signal to stop the Y axis servo will only be generated when the cells are equally illuminated; that is, when balanced signals are received therefrom. This latter condition will only occur when the slot such as 36 is aligned exactly midway with a line halfway between the associated cells.

By utilizing an additional row indexing template such as 41 suitably marked in accordance with the particular control template being used, economy in overall movements of the scanning system can be achieved.

Referring now to the lower left portion of the drawing, the operation and purpose for the masking template 47 will be described. It should be understood that the masking template may need only be utilized in certain rare circumstances and that normally such would not be necessary. Actually, the purpose for the masking template 47 is to prevent spurious signals from operating the drill means that could possibly occur because of certain areas on the control template which result when a photocopy is made and which can be interpreted as one of the position marking openings. For example, the control template 29 may include a transparent margin 48' and possibly transparent irregular area portions 49'. Since light can pass through these areas, signals generated by the dual photo unit 33 might result in a drilling operation should one of the holes on the master template happen to fall in a corresponding given area.

The masking template 47 serves to prevent this generation of spurious signals and towards that end, it is provided with masked portions such as indicated at 48 for the margins and at 49 for the given areas in the center. These masked portions correspond in exact position to the undesirable areas of the control template 29. The light source 51 and photo unit 52 serve to continuously provide an enabling signal on the line 53 to assure that signals will be properly passed from the sequencing and control circuits to the servo motors so long as the photo unit 52 is receiving light from the source 51. However, as soon as the masked portion 49 intercepts the light from the source 51 to the photo unit 52, the enabling signal on line 53 is terminated and this action will prevent spurious signals from operating the servos as might result when the light source 32 associated with the control template passes through the area 49' to energize the dual photo unit 33.

With respect to the foregoing, it should be understood that the masked areas 48 and 49 on the masking template 47 could be made transparent and the transparent portion of the template made completely opaque. In this event, there would not be provided any enabling signal on the line 53 but rather, a signal would appear on the line 53 only when the area corresponding to the transparent areas 49' on the control template permitted light to pass from the source 51 to the unit 52. This signal could be employed to nullify the effect of any signals generated by the dual photocell unit 33 for the master template and thus the same desirable result is accomplished of avoiding inadvertent operation of the drill means in response to spurious signals.

In addition to the foregoing various innovations and their operation, there remains the last feature of this invention which is not essential but nevertheless desirable. This feature relates to the automatic turning off of the drill units in the event a bore hole is not completed through the various circuit boards such as might occur if a drill broke. This circuit has been described with respect to the flip-flop circuit 57 and pulse gate circuit 58. The manner, however, in which the circuits actually operate will now be described.

As indicated by the phantom lines in FIG. 1, there is associated with each of the drill heads 12, 12', 12" and so forth a flip-flop and gate circuit. The various flip-flops are all in one state. As the drill head starts its downward movement in response to a drill signal from the Z axis servo 19, a gate pulse from the gate pulse circuit 58 is generated. When the drill engages the conducting bottom surface 54 of the circuit board, a signal is generated which changes the flip-flop to its other state. This action terminates the gate pulse and prevents it from affecting the drill heads. However, should the drill not make contact with the conducting surface 54 as would occur if a hole were not drilled completely through the board or if a drill broke, the flip-flop will then remain in its initial state and the gate pulse continues until the drills have again been raised at which time the end of the gate provides a pulse on line 60 that turns the drills off. By providing a gate pulse of a proper time width, the turning off of the drills can be delayed until they have been raised to their up positions. It will thus be evident that the system will automatically be shut down in the event that any one hole is improperly bored.

From the foregoing description, it will be evident that the present invention has provided a greatly improved work positioning system wherein any desired programming for the drilling of printed circuit boards can readily be carried out by simply providing the appropriate control template.

It is to be understood that the description of the particular embodiment set forth is merely illustrative of one means for carrying out the desired sequence of operations. It should be understood that in many instances equivalent means could be employed. For example, rather than employ a control template constituting a positive photocopy wherein the holes 30 are transparent to mark the locations and the remaining portion of the template opaque, it is possible to have the hole locations simply opaque or black dots while the remaining portion of the template is transparent. In this event, control of the servos would take effect as a consequence of lack of a signal being received from the photo unit 33. The same remarks apply to the row indexing control templates 35 and 41. Stated generally, it is only necessary that the sensing means which is responsive to a given indication or marking on the template be provided in order to control the various signals to the servo motors.

What is claimed is:

1. A work position scanning system for automatically successively positioning a work in a plurality of given positions in accordance with one program of a number of possible programs, comprising, in combination:
    (a) a master template having holes therein in successive positions including all positions defined by all of said number of possible programs;
    (b) a control template having positions indicated thereon corresponding to positions defined by said one program;
    (c) servo means for moving said work, master template, and control template simultaneously as a unit structure;
    (d) sequencing and control means connected to successively stop said servo means approximately at said plurality of given positions in response to control signals; and
    (e) control signal generating means including:
        (1) a first stationary sensing means responsive to the passing of said positions indicated on said control template when moving to provide said control signals to said sequencing and control means; and
        (2) a second stationary sensing means responsive to the positioning of a hole in said master template in given relationship thereto upon stopping of said servo means for providing further control signals to said sequencing and control means to thereby effect an exact positioning of said work in accordance with the position of said hole in said master template.

2. A system according to claim 1, in which said work comprises a printed circuit board through which holes are to be drilled at said plurality of given positions.

3. A system according to claim 1, in which said holes in said master template define a plurality of parallel rows of holes, said servo means including first and second servo motors for moving said unit structure in X axis and Y axis directions respectively where said X axis direction defines movement along said rows and said Y axis direction defines movement at right angles to said rows, said first sensing means comprising:
    (a) a stationary light source disposed above said control template; and
    (b) a stationary dual photocell unit disposed below said control template, said dual photocell unit including first and second photocells spaced from each other along the direction of said X axis and responsive to a change in light from said light source whenever an indication denoting one of the positions on said control template moves to intercept light from said source passing to said photocells to provide first and second control signals to said sequencing and control means, said first signal being derived from said first photocell to decelerate said first servo motor to relatively slow movement, and said second signal stopping said servo motor when said indication is between said light source and said second photocell, said second indicating means then effecting said exact positioning in accordance with the position of the corresponding hole in said master template.

4. A system according to claim 3, including: a row indexing template in the form of an elongated medium having row position indications extending in the direction of said Y axis and spaced to correspond to the spacing of said parallel rows in said master template; means interconnecting said medium with said servo means to move in the direction of said Y axis only; and a third sensing means in the form of a light source and dual photocell unit on opposite sides of said medium such that a signal is generated by said cells when said control template is properly positioned to have a row of indications scanned by said first sensing means, said signal being passed to said sequencing and control means to stop said second servo motor so that motion of said unit structure is in the direction of said X axis only.

5. A system according to claim 4, including: an additional row indexing template in the form of a further elongated medium having row position indications corresponding only to the rows in said control template having no indications; means interconnecting said further medium with said servo means to move in the direction of said Y axis only; and a fourth sensing means in the form of a light source and photocell unit on opposite sides of said further medium such that a further signal is generated by said cells when said control template is properly positioned to have a row of indications scanned by said first sensing means, said further signal being passed to said sequencing and control means to nullify the effect of said signal from said third sensing means so that said unit structure does not stop and scan those rows on said control template which lack indications.

6. A system according to claim 3, including a masking template having given masking areas thereon in positions corresponding to given areas on said control template subject to interpretation as an indication by said first sensing means which certain areas it is desired to avoid being interpreted as indications; means interconnecting said masking template with said servo means to move with said unit structure; and a fifth sensing means in the form of a light source and a photocell unit on opposite sides of said masking template such that a masking signal is generated by said cell when said masking template assumes a position wherein said given areas intercept light from said source to nullify control signals passed by said third sensing means to said sequencing and control means.

7. A system according to claim 2, in which a drill signal is generated by said sequencing and control means in response to final exact positioning of said work, said system including drill means connected to said sequencing and control means and responsive to said drill signal to drill a hole through said circuit board; conducting means disposed beneath said printed circuit board in a position to be engaged by said drill means only if a hole is drilled completely through said board; and drill control means responsive to initial movement of said drill means and final contact of said drill means with said conducting means to maintain operation of said drill means, and responsive to initial movement of said drill means and failure of said drill means to make contact with said conducting means to turn off said drill means.

References Cited
UNITED STATES PATENTS

| | | | |
|---|---|---|---|
| 3,293,442 | 12/1966 | Marantette et al. | 77—32.1 |
| 3,462,610 | 8/1969 | Frost | 250—219 |

ARCHIE R. BORCHELT, Primary Examiner

M. ABRAMSON, Assistant Examiner

U.S. Cl. X.R.

77—32.1; 250—219